US009955465B2

(12) United States Patent
He et al.

(10) Patent No.: US 9,955,465 B2
(45) Date of Patent: Apr. 24, 2018

(54) DOWNLINK CONTROL INFORMATION (DCI) DESIGN FOR LTE DEVICES

(71) Applicant: Intel IP Corporation, Santa Clara, CA (US)

(72) Inventors: Hong He, Beijing (CN); Jong-kae Fwu, Sunnyvale, CA (US); Seunghee Han, Cupertino, CA (US); Hwan-joon Kwon, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 253 days.

(21) Appl. No.: 14/723,284

(22) Filed: May 27, 2015

(65) Prior Publication Data

US 2016/0100382 A1 Apr. 7, 2016

Related U.S. Application Data

(60) Provisional application No. 62/059,749, filed on Oct. 3, 2014.

(51) Int. Cl.
*H04W 72/04* (2009.01)
*H04L 5/00* (2006.01)
*H04W 84/04* (2009.01)
*H04W 28/06* (2009.01)
*H04W 72/12* (2009.01)

(52) U.S. Cl.
CPC ......... *H04W 72/042* (2013.01); *H04L 5/001* (2013.01); *H04L 5/0044* (2013.01); *H04L 5/0055* (2013.01); *H04L 5/0094* (2013.01); *H04W 28/06* (2013.01); *H04W 72/12* (2013.01); *H04W 84/042* (2013.01)

(58) Field of Classification Search
None
See application file for complete search history.

(56) References Cited

U.S. PATENT DOCUMENTS

| 2013/0070690 | A1  | 3/2013 | Moon et al. |
| 2013/0136006 | A1* | 5/2013 | Kim ........................ H04L 5/001 370/241 |
| 2013/0155969 | A1  | 6/2013 | Moon et al. |
| 2014/0092785 | A1* | 4/2014 | Song ........................ H04L 1/00 370/280 |

(Continued)

OTHER PUBLICATIONS

Partial International Search dated Oct. 2, 2015 for International Application No. PCT/US2015/041800; 5 pages.

(Continued)

*Primary Examiner* — Awet Haile
(74) *Attorney, Agent, or Firm* — Schwabe, Williamson & Wyatt, P.C.

(57) ABSTRACT

Compact Downlink Control Information (DCI) format designs reduced the overhead of Physical Downlink Control Channels (PDCCHs) are provided. The compact DCI format designs may include using the extended RBGs size reduces the Resource Block Assignment (RBA) field of DCI; using modified format of extended Carrier Indicator Field (CIF) field supports numerous Component Carriers (CCs); making several CC-specific information field within DCI formats be common achieves a fast CCs activation/deactivation; and one or multiple DCI contents which need to be applied for different CCs are concatenated in a DCI.

7 Claims, 10 Drawing Sheets

(56) References Cited

U.S. PATENT DOCUMENTS

2014/0169312 A1\* 6/2014 Wang .................... H04W 48/12
370/329
2015/0249973 A1\* 9/2015 Park ........................ H04L 5/001
370/329

OTHER PUBLICATIONS

International Search Report and Written Opinion dated Jan. 19, 2016 for International Application No. PCT/US2015/041800; 15 pages.
3GPP, "Technical Specification Group Radio Access Network; Evolved Universal Terrestrial Radio Access (E-UTRA); Multiplexing and channel coding (Release 12)," 3GPP TS 36.212 V12.2.0 (Sep. 2014), Sep. 26, 2014, Lte Advanced, 89 pages.
Article 94(3) issued Jan. 23, 2018 from European Patent Application No. 15748366.0, 4 pages.

\* cited by examiner

DOWNLINK CONTROL INFORMATION (DCI) DESIGN FOR LTE DEVICES

RELATED APPLICATIONS

This application claims priority from U.S. Provisional Application No. 62/059,749, entitled "A NOVEL DOWNLINK CONTROL INFORMATION (DCI) DESIGN FOR NEW LTE DEVICES," filed on Oct. 3, 2014, which is incorporated by reference herein in its entirety.

FIELD

Embodiments of the present disclosure generally relate to the field of wireless communication, and more particularly, to Downlink Control Information (DCI) design for LTE devices.

BACKGROUND

3rd Generation Partnership Project's (3GPP) long term evolution-advanced (LTE-A) wireless communication standard may be modified to add support for multi-user multiple-input multiple-output (MU-MIMO) systems. In LTE-A, each UE may be configured via radio resource control (RRC) signaling to be served by multiple aggregated component carriers (CCs), namely carrier aggregation (CA).

Carrier aggregation (CA) was introduced by LTE-A in order to support increased throughput, to prevent cost increase due to introduction of broadband radio-frequency (RF) elements and to provide compatibility with existing systems. Carrier aggregation enables data communications between a UE and an eNB through a plurality of carriers with same or different bandwidths.

Downlink control information (DCI) is used to carry scheduling assignments and other type of control information, which is transmitted on Physical Downlink Control Channel (PDCCH). It also carries a number of information fields such as for the modulation and coding scheme (MCS) and resource block assignment (RBA) and hopping resource allocation for data transmission. The need of scheduling a huge amount of UEs in a single TTI may incur large physical downlink control channel (PDCCH) requirement and available PDCCH resources may become a bottleneck for downlink scheduling in case of CA with large number of CCs (e.g. 32 CCs.). The design of the DCI on PDCCH for CA operation with a large amount of CCs is important with respect to overhead, efficiency, reliability, robustness, and complexity.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
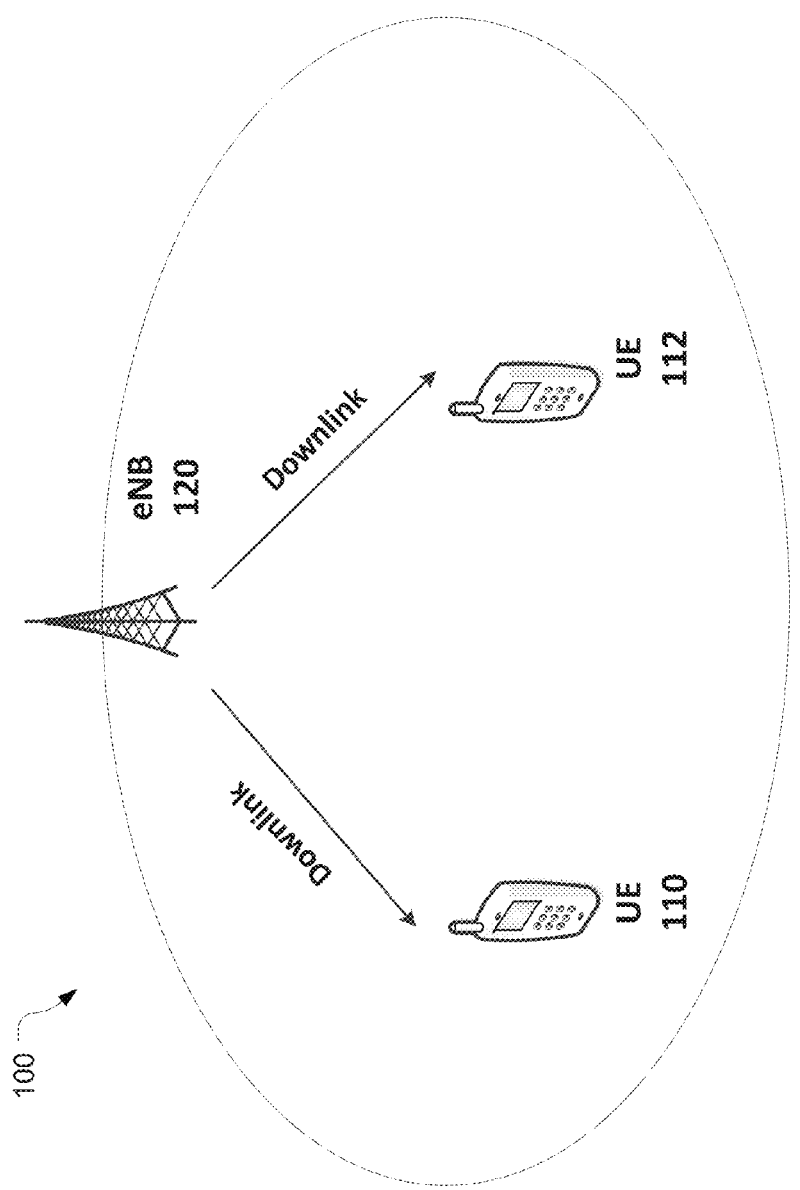
FIG. 1 is a diagram of an embodiment of wireless communication system in accordance with various embodiments.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the term "or" is used as an inclusive term to mean at least one of the components coupled with the term. For example, the phrase "A or B" means (A), (B), or (A and B); and the phrase "A, B, or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), or memory (shared, dedicated, or group) that execute one or more software or firmware programs, a combinational logic circuit, or other suitable hardware components that provide the described functionality.

The carrier aggregation (CA) work started in Release 10 (R10) 3GPP LTE-A system with the basic CA feature support, enabling aggregation of up to 5 carriers of the same frame structure. With the tremendous growth of LTE-capable devices, many LTE deployments are becoming capacity limited due to interference and the volume of data delivered. 3GPP is considering to support wider spectrum bands at UE side to boost the peak data rate performance by standardizing enhanced CA operations with an increased number of carriers (e.g. up to 32 Component Carriers (CCs) in the C-band (3.4-4.2 GHz) licensed band and 5 GHz (with ~500 MHz of unlicensed spectrum) for Licensed-Assisted Access (LAA)) to provide more resources for data capabilities and better manage interference.

Some R10 CA features were designed based on specific and/or simplified assumptions. For instance, some designs were optimized for 2 CCs for UE in CA, some designs assumed a small number of active UEs, etc. The number of CCs used in CA deployments is increasing beyond 8 up to 32 CCs, for example. Management and operation of these increased number of carriers needs to be examined in order to provide a resource-efficient system.

In R10, PDCCH for each CC scheduling is individually encoded and transmitted. Cross-carrier scheduling may be supported for up to 5 CCs, wherein a PDCCH scheduling a Physical Downlink Share Channel (PDSCH) on a CC maybe transmitted on another CC that is different from the CC having the PDSCH transmission. With a huge number of aggregated CCs and growing number of active CA capable UEs, large PDCCH overhead may be incurred. This may especially be the case considering the typical scenario that a limited number of CCs on licensed band (e.g., 1 CC) convey all downlink/uplink (DL/UL) control signaling for all CCs (e.g., 32 CCs) on licensed and unlicensed bands. Each PDCCH may need at least one control channel element (CCE) for its transmission. When there are numerous UEs with each having multiple PDCCHs, PDCCH overhead might become a significant issue. Hence, it is desirable to find some ways to address PDCCH overhead and blocking probability issues in LTE systems.

So far, a limited number of resource blocks (RBs) aggregation is supported for different bandwidth (e.g., 1.4, 3, 5, 10, 15 and 20 MHz). If the number of resource blocks available for operator's use is larger than the closest specified aggregation (e.g., 2 MHz and 12 MHz), those RBs outside of closed supported BW are wasted.

In this disclosure, some methods and devices are provided to support numerous CCs aggregation in LTE-A (R13) and its future releases (R14, etc.) to resolve the PDCCH inefficiency/overhead and resource wastage issues as noted above according to novel DCI designs.

FIG. 1 illustrates an embodiment of a wireless communication system 100. FIG. 1 is exemplary and may have other components or arrangements in other embodiments. The wireless communication system 100 may comprise at least a UE 110, a UE 112 and an access device 120. The access device may be an eNB 120, a base station, or other components that promote network access for the UE 110 and UE 112. The UE 110, which may be referred to as advanced UE 110, can support advanced DCI formats introduced by the disclosure, and the UE 112, which may be referred to as legacy UE 112, can support only legacy DCI formats, e.g., current DCI format 0 or 1, used in 3GPP R10 or 12 LTE systems. It will be understood that advanced UE 110 may support advanced features in R13 and later LTE systems and may further support legacy features, e.g., legacy DCI formats.

The wireless link may conform to any of a plurality of telecommunications standards or initiatives, such as those described in the 3GPP, including LTE, LTE-Advanced, GSM, GPRS/EDGE, High Speed Packet Access (HSPA), and Universal Mobile Telecommunications System (UMTS). Additionally or alternatively, the wireless link may conform to any of a plurality of standards described in the 3GPP2, including interim Standard 95 (IS-95), Code Division Multiple Access (CDMA) 2000 standards 1×RTT or 1×EV-DO. The wireless link may also be compatible with other standards, such as those described by the Institute of Electrical and Electronics Engineers (IEEE), or other industry forums, such as the WiMAX forum.

In various embodiments, an advanced DCI format with an extended carrier indicator field (CIF) is provided. The advanced DCI format with the extended CIF can be utilized to support multi-CCs. In particular, in order to support up to X CCs cross-carrier scheduled by the other single carrier, where X≥8, a viable method is provided to directly increase a legacy CIF field size in legacy DCI format from 3 to Y bits, where Y=ceiling($\log_2 X$)+1, where X is a number of the plurality of CCs scheduled by a single carrier, but not including the single carrier. For example, if CC0 schedules CC0, CC1, CC2, and CC3, then X is equal to 3 because CC0 is not counted in X. The legacy DCI format may be one of DCI formats used in 3GPP 12 LTE system.

In some embodiments, Z bits, where Z=Y−3, of one or more other information fields in an advanced DCI format may be used as the most significant bit (MSB) of the Y-bits CIF of legacy DCI format. For example, a 4-bit CIF field, e.g., Z=4, in an advanced DCI format can be formed by combination of bits from two standard information fields, for example, a 3-bit legacy CIF field and 1 MSB bit of a hybrid automatic repeat request (HARM) process number field, to allocate PUSCH/PDSCH resources on up to 16 cross-carrier scheduled CCs without changing the size of legacy DCI format. In some embodiments, the extended CIF may only be present in PDCCH located in the UE-specific search space. In this manner, an advanced DCI format may be obtained by concatenation of multiple legacy DCI formats for, e.g., a number of CCs configured by higher layers for joint grant by the advanced DCI format Embodiments provide two options for determining the number of bits in a CIF field, which may be 0-bits, 3-bits or 4-bits, for example. In the first option, the number of bits may be configured by eNB through higher layer signaling or fixed in 3GPP Technical Specifications (TSs) depending on a number of CCs configured per UE. In the second option, the CIF size may vary based on a number of CC sets cross-carrier scheduled by a single scheduling CC. This option may further reduce the overhead associated with CIF for a given UE. A UE may compute the CIF value according to total number of CCs that are cross-carrier scheduled by a single scheduling downlink CC. In one embodiment of the disclosure, if the number of a set of CCs cross-carrier scheduled by a single Downlink (DL) CC is larger than 8, UE may assume a 0-bit CIF field on DCI formats for PDSCH/PUSCH on a CC within this set; a 3-bit CIF field may be assumed, otherwise.

In various embodiments, a compact advanced DCI format (hereinafter simply "compact DCI format") with a scalable Resource Block Group (RBG) size is provided.

Three different Resource Block Assignment (RBA) schemes are currently defined in LTE systems. These RBA schemes can be used in legacy DCI formats for PDSCH reception and PUSCH transmission. In 3GPP LTE R12 system, Resource Block Group (RBG) allocation is provided for uplink resource allocation type 1 and downlink resource allocation type 0 and 1. An eNB can allocate RBG(s) to a scheduled UE, where an RBG is a set of consecutive physical resource blocks (PRBs). Resource block group size (P) may defined as a function of the system bandwidth as shown in legacy column of Table 1.

TABLE 1

RBG Size vs. System Bandwidth

| System Bandwidth $N_{RB}^{DL}$ | RBG Size (P) | |
|---|---|---|
| ≤10 | 1 | 1 · K |
| 11-26 | 2 | 2 · L |
| 27-63 | 3 | 3 · M |
| 64-110 | 4 | 4 · N |
| | legacy | advanced |

To reduce the downlink control overhead—particularly motivated by expected use case that transmission of large packets often occurs in CA case—embodiments describe an advanced RBG size that is larger than the legacy RBG size as discussed below.

Referring to Table 1, the advanced RBG size may be defined as a multiple (for example, K, L, M and N values, which may be integers) of legacy RBG size for each legacy system bandwidth, as shown in Table 1. This might be desirable to avoid resource wastage due to a Resource Block Assignment (RBA) "hole" and may further lessen impact on scheduling RBs for legacy UEs on a backward compatible carrier. It is also possible that a common RBA scaling factor may be fixed in 3GPP TSs and applied for any system bandwidth. For example, K=L=M=N=2, in some embodiments.

Table 2 illustrates a table of RBA field sizes, in bits, in DCI formats with legacy and advanced RBG sizes under the assumption that DCI format 0 RBA is applied on a single carrier in accordance with some embodiments.

TABLE 2

RBA field size in DCI formats

| System Bandwidth $N_{RB}^{DL}$ | Size of Resource Block Assignment (RBA) in DCI Formats | | Overhead Reduction |
|---|---|---|---|
| 6 | 6 | 3 | 50% |
| 15 | 8 | 5 | 37.5% |
| 25 | 13 | 6 | 53.8% |
| 50 | 17 | 9 | 47.1% |
| 75 | 19 | 10 | 47.4% |
| 100 | 25 | 13 | 48% |
| | legacy | advanced | |

Furthermore, the RBG sizes for different system bandwidths can be fully configurable by the network (e.g., eNB 120) and may be independent from the sizes defined in the current 3GPP TSs. To be more specific, the RBG Size (P) may be signaled by the eNB 120 and it may be any value. For example, the RBG size may be 1-16, in an embodiment using 4-bit signaling; 1-32 in an embodiment using 5-bit signaling; or 1-64 in an embodiment using 6-bit signaling. In this manner, the size of a corresponding bitmap, where each element indicates whether a corresponding RBG is assigned, may be significantly reduced. In an extreme case, the RBG size may be configured to be the same as the system bandwidth in a number of RBs, e.g., P=110 in case N_RB^DL=110. In this particular example, an RBG allocation bit can be completely omitted in DCI and the DCI size (e.g., the number of bits in the DCI) can be substantially reduced.

If the UE knows the RBG value used by eNB 120 to construct DCI formats, UE-side hypothesis for DCI format decoding may be avoided. RBG size can be semi-statically configured by the eNB 120 through higher layer signaling per UE or per UE per serving cell. For example, a 1-bit flag can be used to indicate RBG size per UE per serving cell through higher-layer signaling. This will enable the UE to differentiate between the two RBG size configurations in a semi-static manner. With such a configurable RBG size mechanism, the eNB 120 can reduce DCI format size for some advanced CA-capable UEs, but still can allocate the same number of RBs for data transmission. Selection of the RBG size for its own serving cells may depend on the design of the algorithm implemented in the eNB. In some embodiments, selection of the RBG size may depend on the deployment scenarios, such as intra-band/inter-band, homogeneous/heterogeneous networks, licensed or unlicensed band, and a UE's traffic characteristics. A tradeoff analysis may be performed to ensure good PDCCH overhead saving and acceptable scheduling impact.

Figure 2:
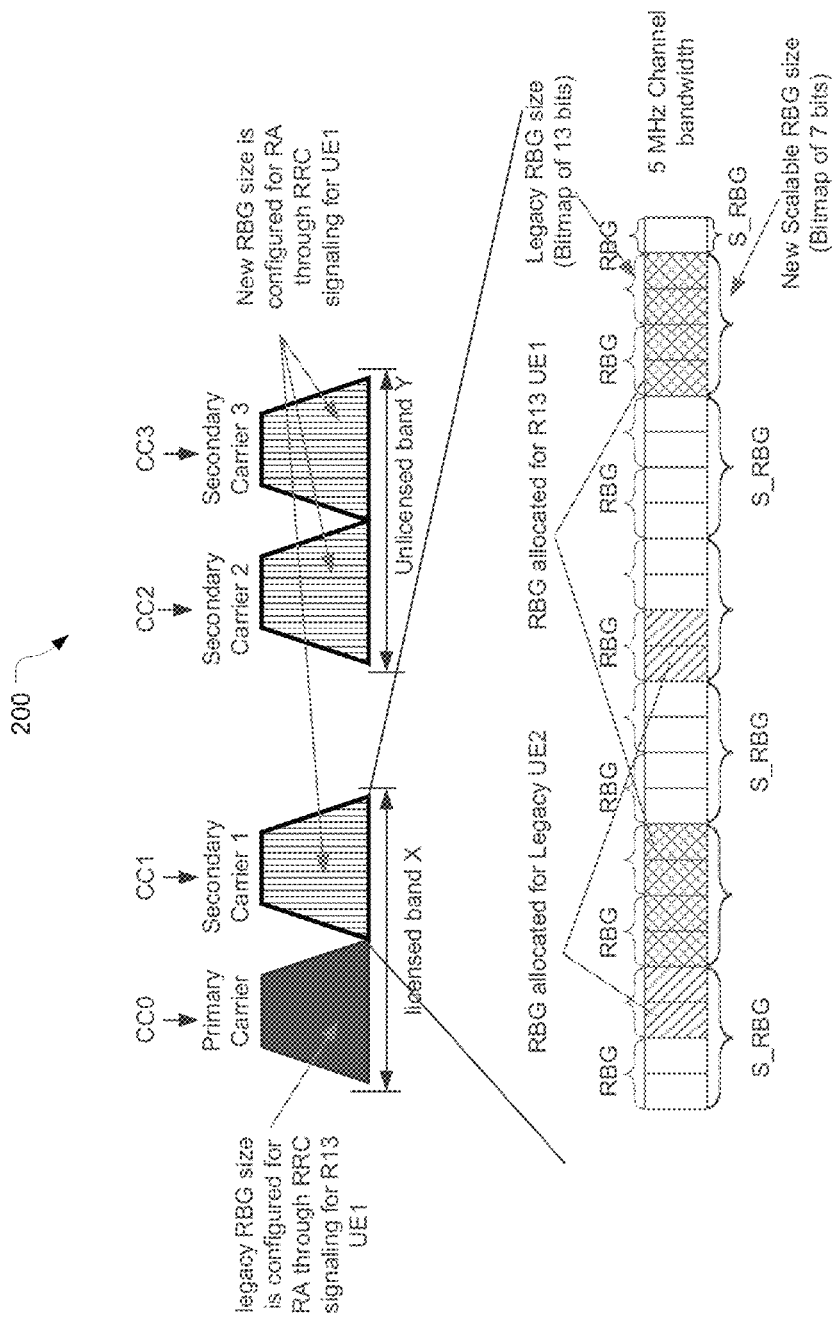
FIG. 2 illustrates an example of using an RBG size for resource allocation, in accordance with various embodiments.

FIG. 2 is a diagram illustrating a scalable RBG size design in accordance with some embodiments. In these embodiments, consider an advanced, CA-capable UE 110, e.g., a UE supporting a compact DCI format, configured with a primary carrier (e.g., CC0) and a first secondary carrier (e.g., CC1) on licensed band X. Additionally, UE1 may be configured with second and third secondary carriers (e.g., CC2 and CC3) on unlicensed band Y. For resource allocation, the eNB 120 may configure a legacy RBG size for CC0 and new, e.g., larger, RBG sizes for CC1, CC2 and CC3 based on a DL measurement report, a UE traffic property, or a deployment scenario. It may also be assumed that a legacy UE 112 camps on backward compatible CC1 for data communication. The UE 112 may support a legacy DCI having DCI format 0 or 1 used in 3GPP Release 10 or Release 12 LTE system. This scenario is illustrated in FIG. 2

To allocate 8 RBs on CC1 to advanced UE110, a 7-bit bitmap RBA field (or Resource Allocation (RA) field in FIG. 2) may be set as "0100010" as an advanced RBG size, e.g., 4, is applied on CC1 for UE110, where a value of "1" indicates that the RBG has been allocated to the UE110. A 13-bit bitmap RBA field may be set as "0011000000110" to allocate the identical RBs to legacy UE112, with a legacy RBG size of 2. All available RBs can be allocated to legacy UE110s or advanced UE112s given that the advanced RBG size is a multiple of the legacy RBG size. To allocate legacy RBG 2 and 7 to legacy UE112, as shown in FIG. 2, the 13-bits RBA field should be set as "0100001000000."

In some embodiments, the RBG size used for resource allocation may be scaled as a function of the number of available RBs on a carrier for advanced UEs. For instance, the RBG size may be scaled by a factor of $$\left\lceil K = \frac{B}{B_0} \times R \right\rceil,$$

where $B_0$ and B denote total available resource block numbers for legacy UEs and advanced UEs, respectively; R denotes an RBG size depending on the system bandwidth $B_0$. Legacy UEs may be aware of value $B_0$ only by reading broadcast system information. The value of B may be conveyed by the eNB using higher layer signaling to advanced UEs to utilize data communication on extended RBs. Thus, in some embodiments an advanced RBG size may be determined by scaling a legacy RBG size by a ratio of total available resource block numbers of configured CCs for joint grant by an advanced DCI format to the number of resource blocks valid for the legacy DCI format. In another embodiment, an advanced RBG size may be determined by scaling a legacy RBG size by a ratio of total available resource block numbers of CCs scheduled by the advanced DCI format to the number of resource blocks valid for a legacy DCI format according to a given system bandwidth.

Figure 3:
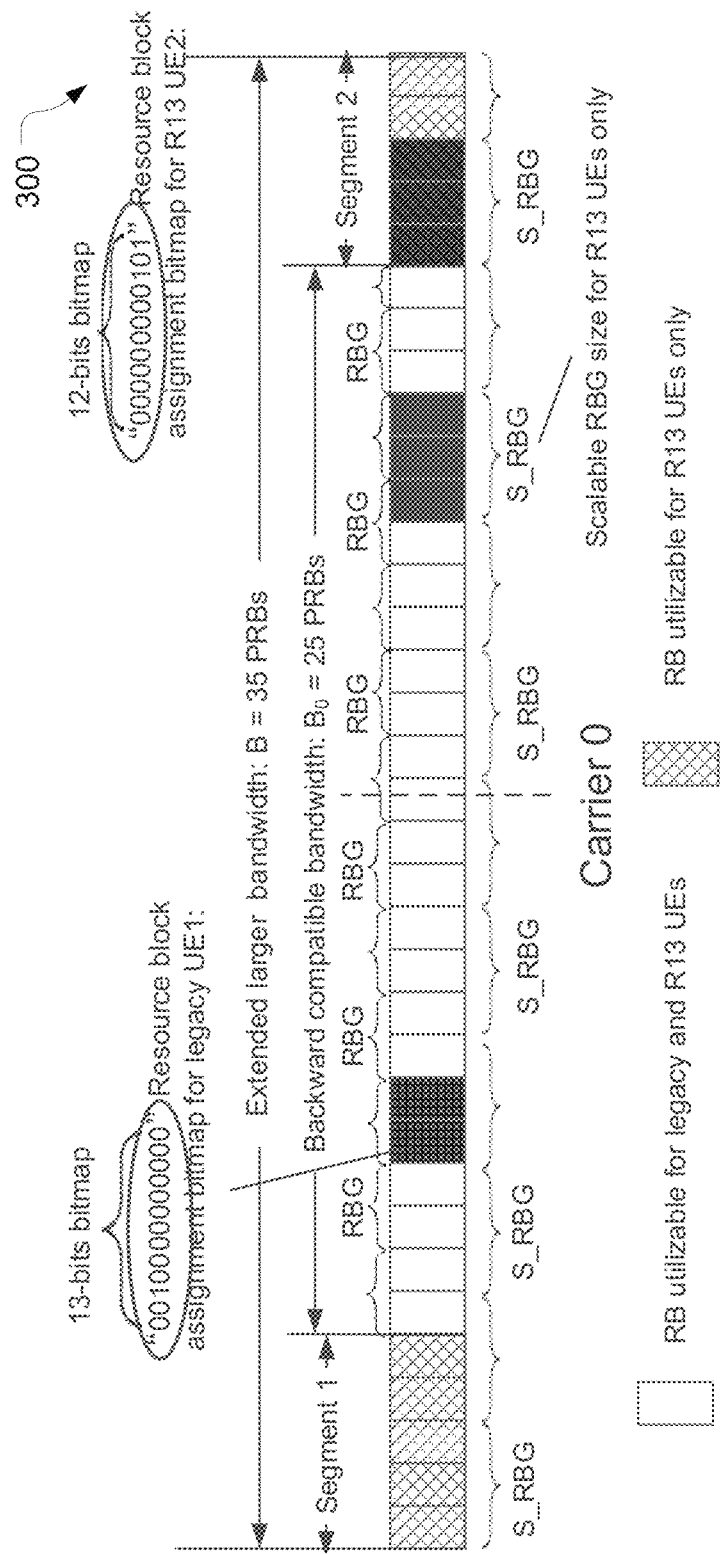
FIG. 3 illustrates an example to use scalable RBG size for resource allocation, in accordance with various embodiments.

FIG. 3 is a diagram illustrating a resource block assignment (RBA) scheme 300 in accordance with some embodiments. The RBA scheme 300 may include a frequency allocation of 35 RBs, where those RBs are aggregated with a backward compatible carrier of 25 central RBs and 10 RBs at two side edges that are only visible to advanced UEs through higher layer signaling. The RBA scheme 300 may be associated with a 40% bandwidth extension as compared with legacy RBA schemes. Using the scalable RBG size method described herein, the scalable RBG (S-RBG) size K, used for resource allocation for advanced UEs, may be calculated to be $$K = \left\lceil \frac{B}{B_0} \times R \right\rceil = \left\lceil \frac{25}{35} \times 2 \right\rceil = 3.$$

consequently, the size of the RBA field may be the same or even smaller than it is in legacy system (e.g., 13-bit bitmap) to avoid increasing DL control signaling overhead. However, the extended RBs can be flexibly leveraged for data communication by advanced UEs, as shown in FIG. 3.

In various embodiments, a compact DCI format with common fields across multiple CCs may be generated. An effective way to avoid a control signaling overhead that scales with the number of configured carriers in PDCCH transmission may be desired. Embodiments provide a joint encoding of multiple legacy DCIs having the legacy DCI formats into one compact DCI format so that a single Cyclic Redundancy Check (CRC) parity bit may be used to reduce CRC overhead. In addition, some information fields can be made common across CCs to further reduce the compact DCI format size. This compact DCI format design may achieve better PDCCH overhead efficiency, while having limited impact on scheduling, resource allocation, channel utilization, flexibility, and the like. The compact DCI format for multi-CCs scheduling may, in some embodiments, only be applied for UEs configured with at least M CCs (e.g. M≥3) while balancing the factors mentioned above. This design may also benefit UE power consumption as the UE monitors only one PDCCH or a reduced number of PDCCHs compared to legacy designs.

In various embodiments, the compact DCI format may have the following information fields: a carrier Indicator field (optional); a HARQ process number field; a resource block assignment (RBA) field; a modulation and coding scheme (MCS) field; a transmit power control (TPC) command field; and a redundancy version field.

In some embodiments, the HARQ process number field may be made common across all or a portion of configured CCs, like codewords in MIMO-based DCI formats.

The bits number of RBA field in a compact DCI may be varied to minimize the size of the newly proposed compact DCI format by using a scalable RBG size depending on the number of scheduled CCs or configured CCs grouped for a joint grant by a compact DCI format (as configured by higher layer signaling, for example). In one example, a scalable RBG size may be determined by scaling a legacy RBG size by the number of CCs configured for joint grant by the advanced DCI format or the number of cc scheduled by the advanced DCI format. Furthermore, a single RBA field can be applied across all or a portion of configured CCs.

Figure 4:
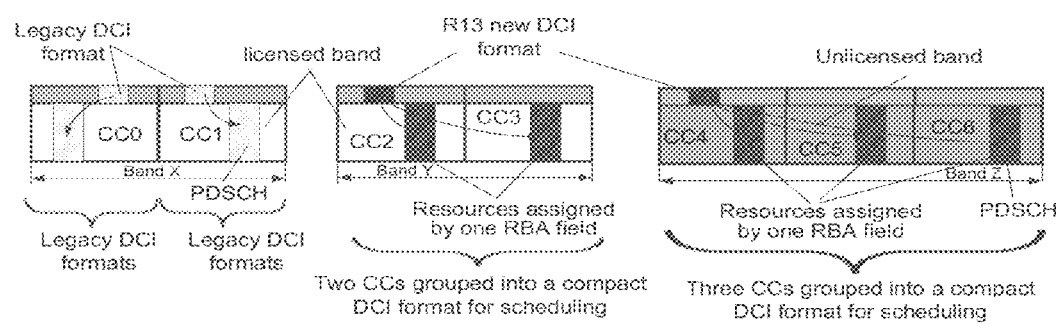
FIG. 4 illustrates an example an example of paired CCs common resource allocation, in accordance with various embodiments.

FIG. 4 is a diagram illustrating a band-specific RBA field in accordance with various embodiments. The band-specific RBA field can be introduced for multi-CCs scheduling to tradeoff between flexibility and control overhead. Thus, CCs located in the same or different bands may share an RBA field for resource allocation. An eNB can configure the paired CCs and the CC that conveys the compact DCI format through higher layer signaling. In FIG. 3, four CCs groups are formed either by eNB configuration through higher layers or follow a band-specific rule for DCI format monitoring. CC0 and CC1 may use the legacy DCI format while the proposed compact DCI format may be used for scheduling on CC2-CC6. The RBGs on CC2 and CC3 may be paired together and resources in the respective CCs may be allocated by the eNB through one single RBA field, in CC2, to save control signaling overhead. Similarly, the RBGs on CC4, CC5, and CC6 may paired together and resources in the respective CCs may be allocated by the eNB through one single RBA field in CC4. In some embodiments, such as that shown in FIG. 4, the grouped CCs may be in a licensed band, for example, Band Y, or in an unlicensed band, for example, band Z.

In some embodiments, the MCS field may be common for a group of CCs. Some embodiments may support fewer group-specific MCS schemes (e.g. 3-bits or 4-bits) compared to legacy LTE system. The supported MCS schemes may include quadrature phase-shift keying (QPSK), 16 quadrature amplitude modulation (QAM), 64QAM, or 256QAM or a subset of them with a limited set of possible coding rates.

In some embodiments, the TPC command field may be used for PUCCH and may be common among all carriers, or a subset thereof. Some embodiments may include two separate TPC fields. The first TPC field may be used as in 3GPP LTE Release 8 for PUCCH power control and the second TPC field may be used to determine the PUCCH resource values from one of the four resource values configured by higher layers, similar to that described in 3GPP LTE Release 10. In particular, if DCI formats for Primary Cell are also included in a multi-CC, jointly-coded compact DCI format and PUCCH format 1b with channel selection is configured for HARQ-ACK feedback (for example, the UE is configured with two aggregated CCs), the second PUCCH resource N may be given by N=M+1, where M is the PUCCH resource associated with n_CCE, where n_CCE is the number of the first CCE used for transmission of the corresponding compact DCI format in PDCCH.

In some embodiments, the redundancy version (RV) field may be on a per carrier basis. In other embodiments, the redundancy version field may be removed. In such embodiments, a fixed RV sequence may be used or it may be assumed that RV=0.

Some consideration may be given to how to design a payload size of the compact DCI format. One way may be to make the compact DCI size fixed regardless of the number of assigned CCs. This could reduce the number of blind decoding attempts of a UE. The overhead of using compact DCI format across CCs may indeed be smaller when scheduling on all carriers that are grouped together. However, since the UE can be dynamically scheduled on any number of grouped carriers, for example, the UE may be scheduled on one of the grouped carriers; the advantages in term of overhead reduction may be reduced in this case.

One possible scheme is to provide a DCI format with carrier information for explicit indication of the status of each CC in accordance with various embodiments. This may be referred to as an activation/deactivation DCI format. The Activation/deactivation DCI format may include a Bi field. If there is a serving cell configured with SCellIndex i through higher layer signaling, the Bi field may indicate the presence of specific CC information fields, which may include scheduling information, in a compact DCI format for CCs among multiple CCs scheduled by the compact DCI. The Bi field may be set to "1" to indicate that the specific CC information fields for the Secondary Cell (SCell) with SCellIndex i shall be present. The Bi field not being set to "1" may indicate that the specific CC information fields for the SCell with SCellIndex i is not present.

The activation/deactivation DCI format may be transmitted in at least a Primary cell (Pcell) PDCCH UE-specific Search Space (USS) and its size may be aligned to a standard DCI format used in Rel 12, e.g., DCI format 1A, to avoid extra blinding decoding attempts. A new UE-specific Radio Network Temporary Identifier (RNTI) may be introduced to differentiate legacy DCI format 1A and the activation/deactivation DCI format. A UE may be expected to monitor for activation/deactivation DCI formats at least in a set of periodic subframes, which may be configured by higher layer signaling. The detected CCs status indication may be valid for a window that has a duration equal to a periodicity of the activation/deactivation DCI monitoring.

Figure 5:
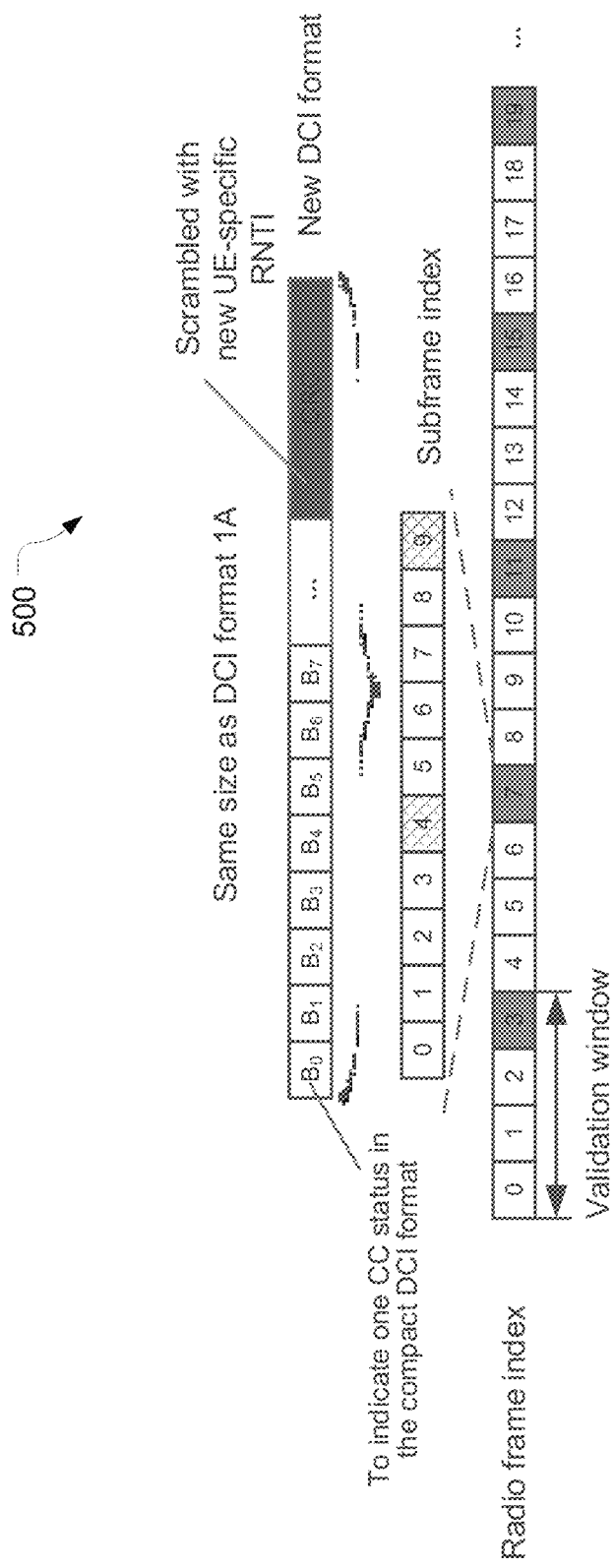
FIG. 5 illustrates an example of CC activation DCI format transmission for compact DCI, in accordance with various embodiments.

FIG. 5 is a diagram illustrating an activation/deactivation DCI format transmission in accordance with some embodiments. The activation/deactivation DCI format may be used to reduce the DL control overhead of joint-coded compact DCI format for multi-CC scheduling. It may be assumed that the activation/deactivation DCI format transmission is configured with 40 ms periodicity; however, periodicity may vary in other embodiments. To increase reception reliability of the activation/deactivation DCI format, the same activation/deactivation DCI format may be repeated within a periodicity, for example, in subframe #4 and #9 within a period.

In various embodiments, the eNB 120 may generate a compact DCI by concatenating information fields of one or more DCIs applied for one CC or different CCs. Embodiments provide methods of scheduling multiple PDSCH on different CCs by a single PDCCH. These embodiments cover the cases where a single PDCCH schedules all PDSCHs for all CCs and cases where a single PDCCH schedules some PDSCHs among all CCs. See, for example, FIG. 4. One or multiple DCI contents that are to be applied for different CCs may be concatenated into a single DCI. The multiple DCI contents may include a Hybrid Automatic Repeat Request (HARD) process number, RBA field, Modulation and Coding Scheme (MCS) field, or Transmit Power Control (TPC) command field for Physical Uplink Control Channel (PUCCH), CIF, RV, CRC and so on. Some DCI contents that could be common for different CCs may be conveyed only once for all CCs.

For example, a DCI, conveyed in a single PDCCH, may include; DCI Contents for CC#0; DCI Contents for CC#1; DCI Contents for CC#2; DCI Contents for CC#3; . . . ; and DCI Contents for CC#N−1.

In another example, a DCI, conveyed in a single PDCCH, may include: a first content for CC#0, CC#1, . . . , CC#N−1; a second content for CC#0, CC#1, . . . , CC#N−1; a third content for CC#0, CC#1, . . . , CC#N−1; . . . ; and a last content for CC#0, CC#1, . . . , CC#N−1.

Since the different transmission modes can be configured for the different CCs, the different types of DCI may be concatenated. For instance, a DCI may include: DCI format X0 for CC#0; DCI format X1 for CC#1; DCI format X2 for CC#2; . . . ; and DCI format XN−1 for CC#N−1.

For another example, a DCI may include: DCI format 2A for CC#0, DCI format 2C for CC#1, DCI format 2D for CC#2, etc.

The CCs for multiple PDSCH scheduling using a PDCCH can be configured by higher layer signaling. For instance, assuming 9 CCs (CC#0 may be for a licensed carrier and CC#1-8 may be for unlicensed carriers), the network can configure CC#1, #3, #5, #7 for the multiple PDSCH scheduling using a single PDCCH.

As a further explanation, the network may configure the following groups, for example, by RRC signaling, for multiple scheduling using each PDCCH: group #0 to include CC#0, which may provide a primary cell on a licensed carrier; group #1 to includeCC#1, #3, #5, and #7, which may be unlicensed carriers; and group #2 to include CC#2, #4, #6, and #8, which may also be unlicensed carriers.

Each group can be scheduled by a respective PDCCH. In this example, three PDCCHs can be transmitted for three groups.

In order to distinguish the PDSCHs on different CCs for which PDCCH is transmitted, a carrier group indication field (CGIF) may be included in each PDCCH. For instance, if CGIF includes 3 bits, up to 8 cell groups can be supported by this embodiment. A CGIF included in a DCI format may indicate a CC group index scheduled by the corresponding DCI format.

In some embodiments, a cell group may include CC's having a common CC-specific feature. For example, a transmission mode may be configured per CC. Therefore, in one embodiment, a cell group may include all CCs that have a particular transmission mode.

As a special scheme of cell-group scheduling by a PDCCH, a single PDCCH can schedule all PDSCHs for all configured CCs. In some embodiments, the PDSCH for a UE can occupy all available bandwidth across all configured CCs. This may be referred to as one-shot scheduling. This feature could be achieved by one additional bit in a DCI to indicate the one-shot scheduling (for example, bit=1 to indicate one-shot scheduling enabled and bit=0 to indicate one-shot scheduling is disabled), or by a new RNTI (for example, a PDCCH scrambled by the new RNTI performs one-shot scheduling while a PDCCH scrambled by another RNTI, for example, C-RNTI, uses individual scheduling as opposed to one-shot scheduling).

Figure 6:
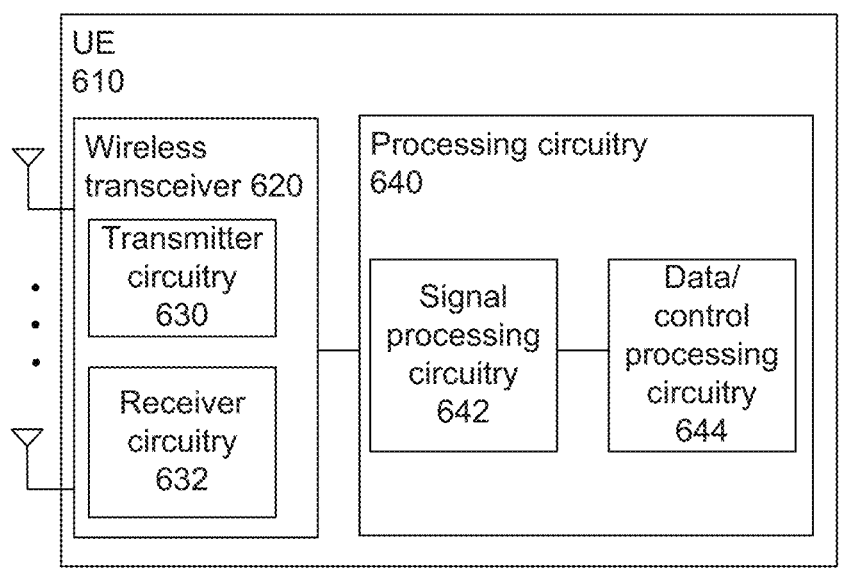
FIG. 6 illustrates UE circuitry, in accordance with various embodiments.

FIG. 6 illustrates UE 610 in accordance with various embodiments. In various embodiments, UE 610 may include a wireless transceiver 620 having transmitter circuitry 630 and receiver circuitry 632. The wireless transceiver 620 may be coupled with processing circuitry 640. The receiver circuitry 632 may be configured to receive a compact DCI according to the compact format on a PDCCH. The processing circuitry 640, coupled with the receiver circuitry 632, may be configured to detect information associated with a serving cell based on the received compact DCI.

The processing circuitry 640 may include signal processing circuitry 642 and data/control processing circuitry 644. In some embodiments, the signal processing circuitry 642 may receive the DCI from the wireless transceiver 620 and decode the DCI to determine, for example, uplink resource allocation (persistent and non-persistent) and descriptions about downlink data transmitted to the UE 610, for example, location, modulation and coding scheme, etc. The decoded DCI may be transmitted from the signal processing circuitry 642 to the data/control processing circuitry 644. The data/control processing circuitry 644 may transmit/receive information based on the decoded DCI.

The wireless transceiver 620 may be coupled to one or more antennas for transmission over the air. The components of the UE 610 may be configured to perform operations similar to those described elsewhere in this disclosure with respect to a UE. In some embodiments, the circuitry of the UE 610 may be implemented in, or perform functions associated with one or more software or firmware modules.

Figure 7:
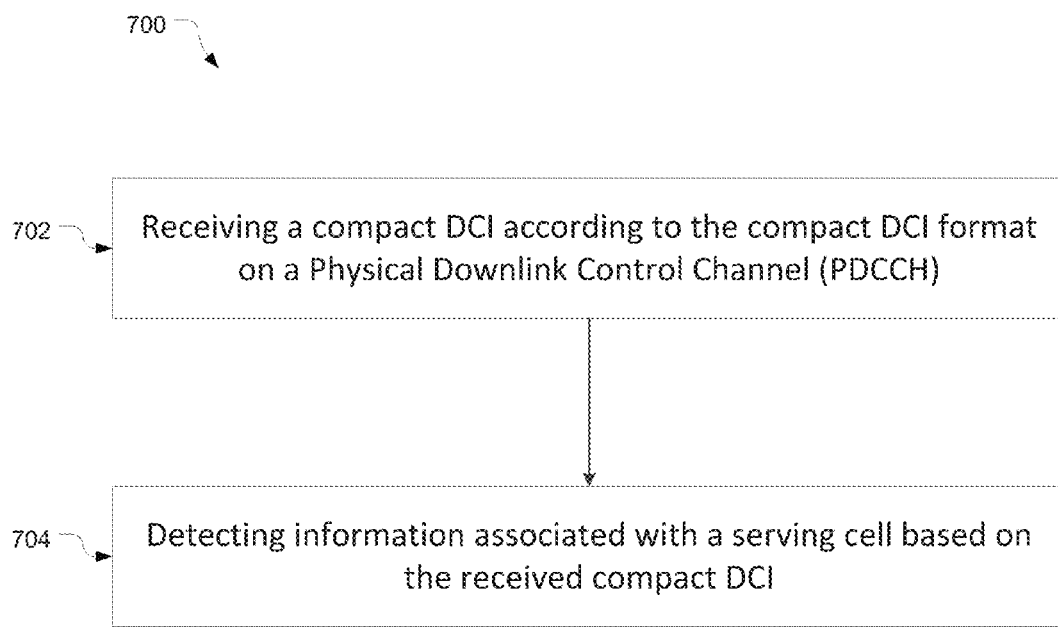
FIG. 7 illustrates the process performed by UE circuitry, in accordance with various embodiments.

In various embodiments, the UE 610 of FIG. 6 may be configured to perform one or more processes, such as process 700 depicted in FIG. 7 in accordance with some embodiments. In embodiments, the process 700 may include, at 702, receiving a compact DCI according to the compact DCI format on a Physical Downlink Control Channel (PDCCH). The compact DCI format may include a plurality of information fields. The process 700 may include, at 704, detecting information associated with a serving cell based on the received DCI. In embodiments, the UE circuitry may be configured to perform one or more additional or alternative process elements, as described elsewhere in this specification.

Figure 8:
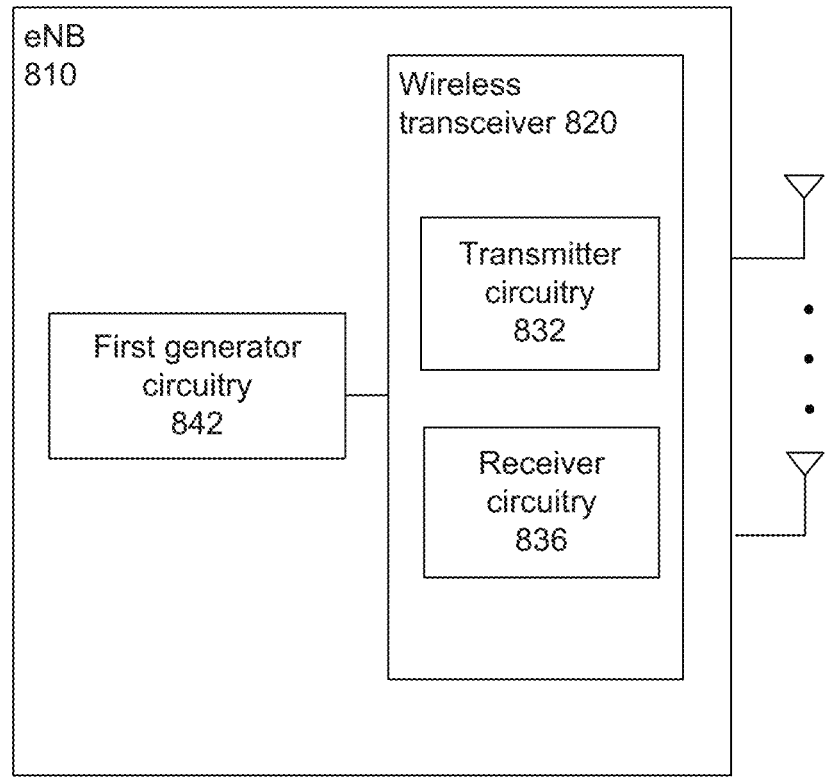
FIG. 8 illustrates eNB circuitry, in accordance with various embodiments.

FIG. 8 illustrates an eNB 810 in accordance with various embodiments. In embodiments, the eNB 810 may include generator circuitry 842 and transmitter circuitry 832. The transmitter circuitry 832 may be disposed in a wireless transceiver 820 along with receiver circuitry 836.

The generator circuitry 842 may be used to generate DCI having an advanced DCI format and to generate DCI having a legacy DCI format. The legacy DCI format may be one of DCI formats used in 3GPP R10 or R12 LTE system, in particular is DCI format 0 or 1. The transmitter circuitry 832 may be used to transmit the DCI having the advanced DCI format to the first type UE that supports this new DCI format and to transmit the DCI having the legacy DCI format.

The wireless transceiver 820 may be coupled to one or more antennas for transmission over the air. The components of the eNB 810 may be configured to perform operations similar to those described elsewhere in this disclosure with respect to an eNB. In some embodiments, the circuitry of the eNB 810 may be implemented in, or perform functions associated with one or more software or firmware modules.

Figure 9:
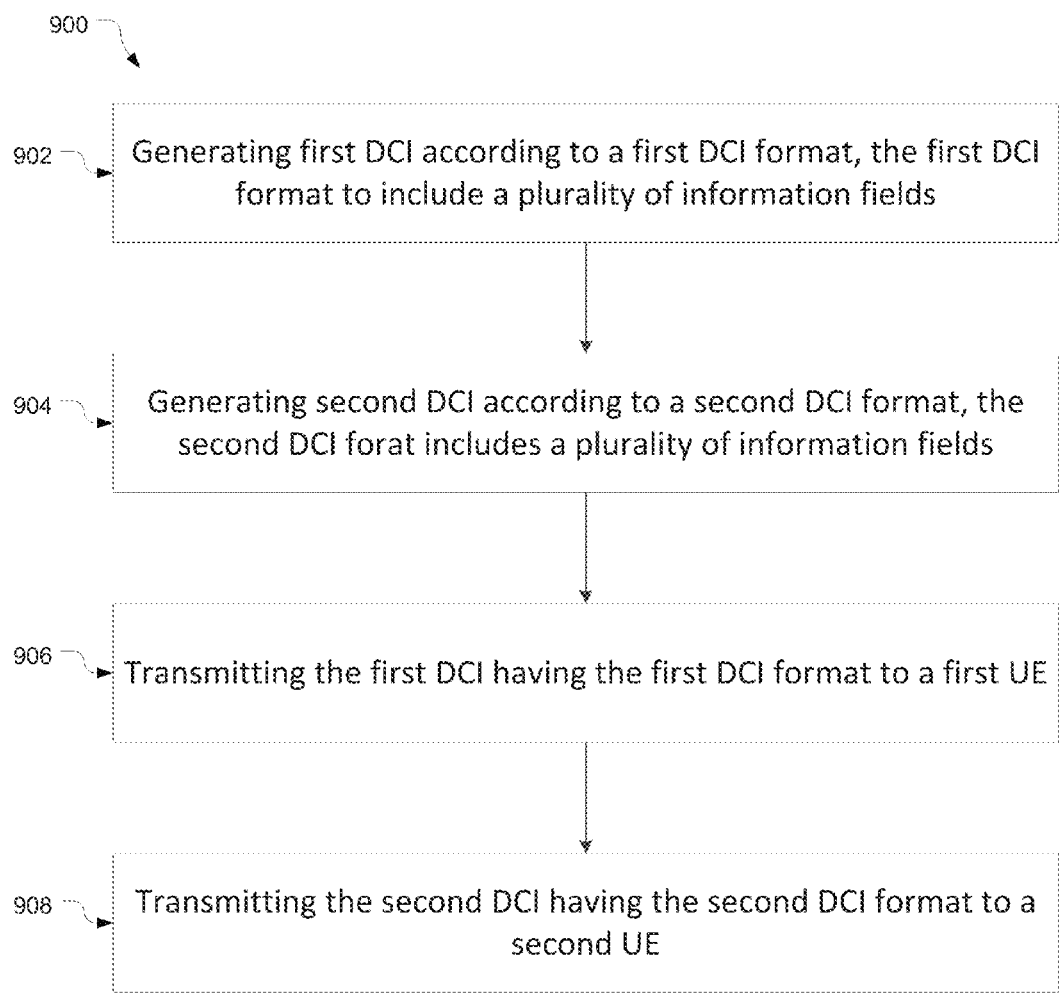
FIG. 9 illustrates the process performed by eNB circuitry, in accordance with various embodiments.

In various embodiments, the eNB 810 may be configured to perform one or more processes, such as process 900 depicted in FIG. 9 in accordance with some embodiments. In embodiments, the process 900 may include, at 902, generating first DCI according to a first DCI format. The first DCI format may include a plurality of information fields as described herein. The process 900 may further include, at 904, generating second DCI according to a second DCI format. The second DCI format to include a plurality of information fields. In some embodiments, the first DCI format may be an advanced DCI format and the second DCI format may be a legacy DCI format. The process 900 may further include, at 906, transmitting the first DCI having the first DCI format to a first UE, for example, an advanced UE. The process 900 may further include, at 908, transmitting the second DCI to a second UE, for example, a legacy UE. In embodiments, the eNB circuitry may be configured to perform one or more additional or alternative process elements, as described elsewhere in this specification.

Figure 10:
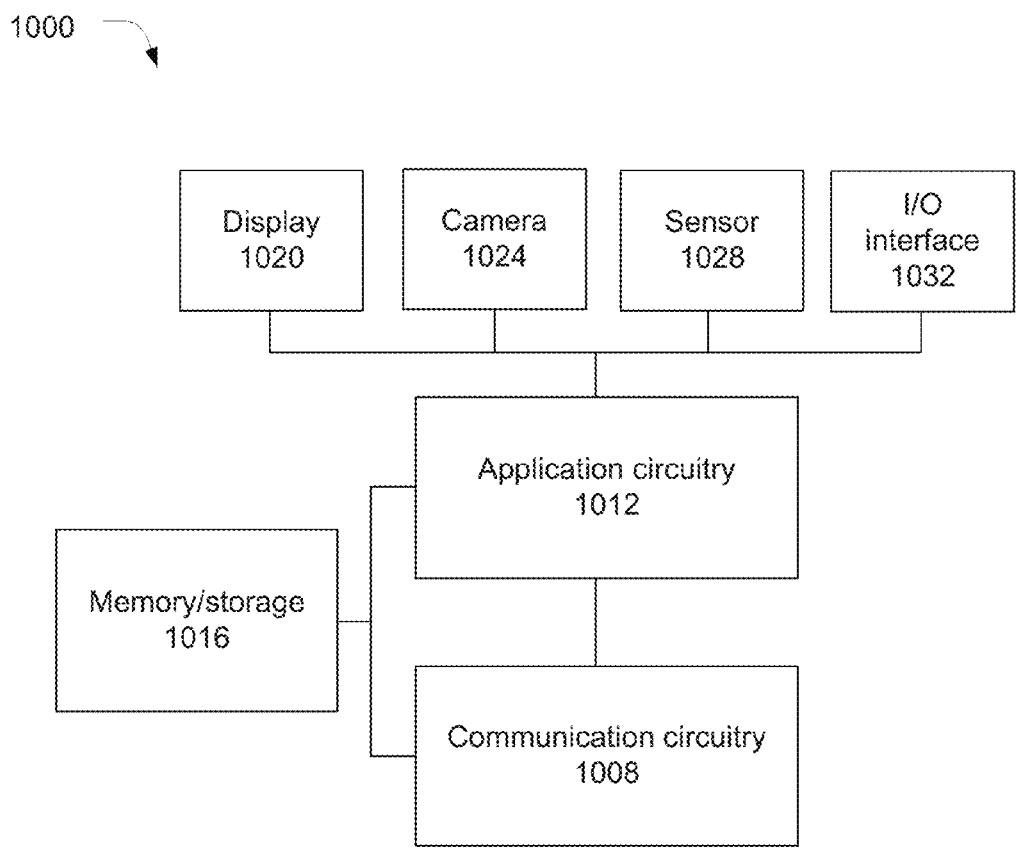
FIG. 10 illustrates an example system, in accordance with various embodiments.

The UEs and eNBs described herein may be implemented into a system using any suitable hardware, firmware, or software configured as desired. FIG. 10 illustrates, for one embodiment, an example system 1000 comprising communication circuitry 1008, application circuitry 1012, memory/storage 1016, display 1020, camera 1024, sensor 1028, and input/output (I/O) interface 1032, coupled with each other at least as shown.

The application circuitry 1012 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 1016 and configured to execute instructions stored in the memory/storage 1016 to enable various applications or operating systems running on the system 1000.

The communication circuitry 1008 may include circuitry such as, but not limited to, one or more single-core or multi-core processors. In some embodiments, the processor(s) may include a baseband processor to handle various radio control functions that enable communication with one or more radio networks via RF circuitry of the communication circuitry 1008. The radio control functions may include, but are not limited to, signal modulation, encoding, decoding, radio frequency shifting, etc. The RF circuitry may enable communication with wireless networks using modulated electromagnetic radiation through a non-solid medium. In various embodiments, the RF circuitry may include switches, filters, amplifiers, etc., to facilitate the communication with the wireless network.

In some embodiments, the communication circuitry 1008 may provide for communication compatible with one or more radio technologies. For example, in some embodiments, the baseband circuitry 1008 may support communication with an E-UTRAN or other wireless metropolitan area networks (WMAN), a wireless local area network (WLAN), or a wireless personal area network (WPAN). Embodiments in which the communication circuitry 1008 is configured to support radio communications of more than one wireless protocol may be referred to as multi-mode baseband circuitry.

In some embodiments, the communication circuitry 1008 may additionally/alternatively provide for communication over one or more wired interfaces.

In embodiments in which the UE 610 is implemented as the system 1000, the processing circuitry 640 may be embodied in the application circuitry 1012 or the communication circuitry 1008 and the wireless transceiver 620 may be embodied in the communication circuitry 1008.

In embodiments in which the eNB 810 is implemented at the system 1000, the first generator circuitry 642 and the second generator circuitry 644 may be embodied in the application circuitry 1012 or the communication circuitry 1008 and the wireless transceiver 820 may be embodied in the application circuitry 1008.

In some embodiments, some or all of the constituent components of the communication circuitry 1008, the application circuitry 1012, or the memory/storage 1016 may be implemented together on a system on a chip (SOC).

Memory/storage 1016 may be used to load and store data or instructions, for example, for system 1000. Memory/storage 1016 for one embodiment may include any combination of suitable volatile memory (e.g., dynamic random access memory (DRAM)) or non-volatile memory (e.g., Flash memory).

In various embodiments, the I/O interface 1032 may include one or more user interfaces designed to enable user interaction with the system 1000 or peripheral component interfaces designed to enable peripheral component interaction with the system 1000. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 1028 may include one or more sensing devices to determine environmental conditions or location information related to the system 1000. In some embodiments, the sensors may include, but are not limited to, a gyro sensor, an accelerometer, a proximity sensor, an ambient light sensor, and a positioning unit. The positioning unit may also be part of, or interact with, the baseband circuitry 1008 or RF circuitry 1004 to communicate with components of a positioning network, e.g., a global positioning system (GPS) satellite.

In various embodiments, the display 1020 may include a display (e.g., a liquid crystal display, a touch screen display, etc.).

In various embodiments, the system 1000 may be a mobile computing device such as, but not limited to, a laptop computing device, a tablet computing device, a netbook, an ultrabook, a smartphone, etc. In various embodiments, system 1000 may have more or fewer components, or different architectures.

The following paragraphs describe examples of various embodiments.

Example 1 includes an apparatus comprising: generator circuitry to generate downlink control information (DCI), according to a DCI format, that includes a carrier indicator field (CIF); transmitter circuitry, coupled with the generator circuitry, to transmit the DCI according to the DCI format to a user equipment (UE), wherein the CIF is to schedule a plurality of component carriers (CCs) with a single carrier.

Example 2 includes the apparatus of example 1, wherein the CIF is configured through higher-layer signaling, determined according to a number of configured CCs, or determined according to a number of CCs scheduled by the single carrier.

Example 3 includes the apparatus of any one of examples 1-2, wherein the CIF includes Y bits, where Y=ceiling(log 2 X)+1, where X is a number of the plurality of CCs scheduled by the single carrier but not including the single carrier.

Example 4 includes the apparatus of any one of examples 1-3, wherein the UE is a first UE, the DCI is first DCI, the DCI format is first DCI format, the CIF is first CIF, and the generator circuitry is further to generate second DCI, according to a second DCI format, that includes a second CIF; and the transmitter circuitry is to transmit the second DCI according to the second DCI to a second UE.

Example 5 includes the apparatus of example 4, wherein a number of bits in the first CIF is larger than a number of bits in the second CIF Example 6 includes the apparatus of any one of examples 4-5, wherein the first CIF includes a plurality of bits that are generated by a combination of bits of a legacy CIF field and a most significant bit (MSB) of a Hybrid Automatic Repeat Request (HARD) process number field.

Example 7 includes the apparatus of any one of examples 4-6, wherein the second DCI format is one of standard DCI formats used in 3GPP Release 12 LTE system.

Example 8 includes apparatus of any one of examples 1-7, wherein the number of bits in the CIF is larger than 3.

Example 9 includes a tangible machine-readable medium having stored thereon instructions that, when executed by a machine, cause the machine to: generate first downlink control information (DCI) according to a first DCI format and second DCI according to a second DCI format, the first DCI format to include a first resource block assignment (RBA) field having a plurality of bits corresponding to a first resource block group (RBG) size, and the second DCI format to include a second RBA field having a plurality of bits corresponding to a second RBG size; transmit the first DCI according to the first DCI format to a first user equipment (UE), and the second DCI according to the second DCI format to a second UE; wherein the first RBG size is larger than the second RBG size, and a number of bits in the first RBA field is smaller than a number of bits in the second RBA field.

Example 10 includes the tangible machine-readable medium of example 9, wherein a number of the plurality of bits in the first RBA field is determined based on a number of configured component carriers (CCs) for joint grant by the first DCI format.

Example 11 includes the tangible machine-readable medium of example 10, wherein the number of configured CCs for joint grant by the first DCI format is configured by higher layers.

Example 12 includes the tangible machine-readable medium of any one of examples 9-11, wherein the first DCI format further comprises a carrier group indication field (CGIF) to indicate a CC group index scheduled by the first DCI format.

Example 13 includes the tangible machine-readable medium of any one of examples 9-12, wherein the first DCI format is further obtained by concatenation of multiple second DCI formats for a number of CCs configured by higher layers for joint grant by the first DCI format.

Example 14 includes the tangible machine-readable medium of any one of examples 9-13, wherein the first DCI format includes one or more common fields applied to one or more of a plurality of component carriers (CCs) configured by higher layers for joint grant by the first DCI format or scheduled by the first DCI format.

Example 15 includes the tangible machine-readable medium of example 14, wherein the one or more common fields comprise a Hybrid Automatic Repeat Request (HARM) process number field, a Modulation and coding scheme (MCS) field, or Transmit Power Control (TPC) command field for physical uplink control channel (PUCCH).

Example 16 includes the tangible machine-readable medium of any one of examples 9-15, wherein the first RBG size is configured through higher layer signaling; is a function of the second RBG size; is an integer multiple of the second RBG size; is determined based on the downlink system bandwidth for the first UE; is determined based on a downlink system bandwidth for the second UE; is given by scaling the second RBG size by a number of component carriers (CCs) configured for joint grant by the first DCI format; is given by scaling the second RBG size by a number of CCs scheduled by the first DCI format; is given by scaling the second RBG size by a ratio of total available resource block numbers of configured CCs for joint grant by the first DCI format to the number of resource blocks valid for the second DCI format; or is given by scaling the second RBG size by a ratio of total available resource block numbers of scheduled CCs by the first DCI format to the number of resource blocks valid for the second DCI format according to a given system bandwidth.

Example 17 includes the tangible machine-readable medium of any one of examples 9-16, wherein the second DCI format is a standard DCI format used in 3GPP Release 12 LTE system.

Example 18 includes a user equipment (UE) comprising: signal processing circuitry to receive and decode a compact Downlink Control Information (DCI) according to a compact DCI format on a Physical Downlink Control Channel (PDCCH); and data or control processing circuitry coupled with the signal processing circuitry, the data or control processing circuitry to detect information associated with a serving cell based on the received compact DCI; wherein the compact DCI format is generated by jointly encoding a plurality of first DCIs having a first DCI format.

Example 19 includes the UE of example 18, wherein the first DCI format is a standard DCI format used in 3GPP Release 12 LTE system.

Example 20 includes the UE of any of examples 18-19, wherein the compact DCI format includes a plurality of information fields and is generated by jointly encoding common parts of a plurality of information fields in the plurality of first DCIs.

Example 21 includes the UE of any of examples 18-20, wherein the compact DCI format includes one or more resource block assignment (RBA) fields, at least one of the one or more RBA fields to be shared by a group of component carriers (CCs) configured by higher layers.

Example 22 includes the UE of example 21, wherein each of said one or more RBA fields in the compact DCI format corresponds to a first resource block group (RBG), and a plurality of second RBGs scheduled by a group of CCs are combined into the first RBG; and wherein individual second RBGs of the plurality of second RBGs are scheduled by individual CCs of a group of CCs.

Example 23 includes the UE of any one of examples 18-22, wherein the compact DCI format includes one RBA field and a size of the one RBA field depends on a number of scheduled CCs by the compact DCI format.

Example 24 includes the UE of example 23, wherein a granularity of RBA is coarser with a larger number of scheduled CCs than than with a smaller number of CCs.

Example 25 includes the UE of any one of examples 18-24, wherein the signal processing circuitry is further configured to: receive a third DCI according to a third DCI format, in scheduling cell UE-Specific Search Space (USS), the third DCI format to include an information field to indicate the presence of scheduling information in the compact DCI format for CCs among multiple CCs scheduled by the compact DCI; wherein a size of the third DCI format is same as a size of a standard DCI format used in 3GPP Release 12 LTE system.

Example 26 includes the UE of example 25, wherein the standard DCI format is a DCI format 1A or 1C.

Example 27 includes the UE of any one of examples 18-26, wherein the compact DCI format includes information fields of a Hybrid Automatic Repeat Request (HARM) process number, RBA, Modulation and Coding Scheme (MCS), or Transmit Power Control (TPC) command for Physical Uplink Control Channel (PUCCH) and these fields are applied for all CCs scheduled by the compact DCI format.

Example 28 includes a system for wireless communication comprising: a memory configured to store program instructions; and at least one processor configured to execute the program instructions to: receive a compact Downlink Control Information (DCI) according to a compact DCI format on a Physical Downlink Control Channel (PDCCH); detect information associated with a serving cell based on the received compact DCI; wherein the compact DCI is generated by concatenating a plurality of information fields of one or more DCIs applied for one Component Carrier (CC) or different CCs.

Example 29 includes the system of example 28, wherein the plurality of information fields are applied for a given CC that is used to schedule uplink and downlink data, or applied for a given set of CCs configured by higher layer.

Example 30 includes the system of any one of examples 28-29, wherein said one or more DCIs are standard DCI formats used in 3GPP Release 12 LTE system.

Example 31 includes the system of any one of examples 28-30, wherein the PDCCH includes a Carrier Group Indication Field (CGIF) that is applied to distinguish the Physical Downlink Share Channels (PDSCHs) on different CCs.

Example 32 includes a method comprising: generating a first downlink control information according to a first downlink control information (DCI) format that includes a first carrier indicator field (CIF); transmitting the first DCI according to the first DCI format to a user equipment (UE), wherein the first CIF is to schedule a plurality of component carriers (CCs) with a single carrier.

Example 33 includes the method of example 32, wherein the first CIF is configured through higher-layer signaling, determined according to a number of configured CCs, or determined according to a number of CCs scheduled by the single carrier.

Example 34 includes the method of any one of examples 32-33, wherein the first CIF includes Y bits, where Y=ceiling(log 2 X)+1, Where X is a number of the plurality of CCs scheduled by the single carrier.

Example 35 includes the method of any one of examples 32-34, further comprising: generating second DCI according to a second DCI format that includes a second CIF; transmitting the second DCI according to the second DCI to a second UE.

Example 36 includes the method of example 35, wherein the number of bits in the first CIF is larger than a number of bits in the second CIF.

Example 37 includes the method of any one of examples 35-36, wherein the first CIF includes a plurality of bits that are generated by a combination of bits of a legacy CIF field and a most significant bit (MSB) of a Hybrid Automatic Repeat Request (HARM) process number field.

Example 38 includes the method of any one of examples 35-37, wherein the second DCI format is one of standard DCI formats used in 3GPP Release 12 LTE system.

Example 39 includes the method of any one of examples 35-38, wherein a number of bits in the first CIF is larger than 3.

Example 40 includes a method comprising: generating first downlink control information (DCI) according to a first DCI format and second DCI according to a second DCI format, said first DCI format to include a first resource block assignment (RBA) field having a plurality of bits corresponding to a first resource block group (RBG) size, and said second DCI format to include a second RBA field having a plurality of bits corresponding to a second RBG size; transmitting the first DCI according to the first DCI format to a first user equipment (UE), and the second DCI according to the second DCI format to a second UE; wherein the first RBG size is larger than the second RBG size, and a number of bits in the first RBA field is smaller than a number of bits in the second RBA field.

Example 41 includes the method of example 40, wherein the first DCI format size is determined based on the number of configured CCs for joint grant by first DCI format.

Example 42 includes the method of any one of examples 40-41, wherein the CCs for joint grant by a first DCI format is configured by higher layers.

Example 43 includes the method of any one of examples 40-42, wherein the first DCI format further consists of a carrier group indication field (CGIF) to indicate the CC group index scheduled by the first DCI format.

Example 44 includes the method of any one of examples 40-43, wherein the first DCI format is further obtained by concatenation of multiple second DCI formats for the multiple CCs configured by higher layers for joint grant by the first DCI format.

Example 45 includes the method of any one of examples 40-44, wherein the first DCI format includes one or more common fields applied for the multiple CCs configured by higher layer for joint grant by the first DCI format or the multiple CCs scheduled by the first DCI format.

Example 46 includes the method of any one of examples 40-45, wherein the common fields further consisting of Hybrid Automatic Repeat Request (HARM) process number, Modulation and coding scheme (MCS) and Transmit Power Control (TPC) command for (PUCCH).

Example 47 includes the method of any one of examples 40-46, wherein the first RBG size is configured through higher layer signaling or is a function of the second RBG size.

Example 48 includes the method of any one of examples 40-47, wherein the first RBG size is an integer multiple of the second RBG size.

Example 49 includes the method of any one of examples 40-48, wherein the first RBG size is a multiple of the second RBG size, or is determined based on the second RBG size, the downlink system bandwidth for the first UE, or the downlink system bandwidth for the second UE.

Example 50 includes the method of any one of examples 40-49, wherein the first RBG size is given by scaling the second RBG size by the number of configured for joint grant by the first DCI format.

Example 51 includes the method of any one of examples 40-50, wherein the first RBG size is given by scaling the second RBG size by the scheduled CCs by the first DCI format.

Example 52 includes method of any one of examples 40-51, wherein the first RBG size is given by scaling the second RBG size by the ratio of total available resource block numbers of configured CCs for joint grant by the first DCI format to the number of resource blocks valid for the second DCI format.

Example 53 includes the method of any one of examples 40-52, wherein the first RBG size is given by scaling the second RBG size by the ratio of total available resource block numbers of scheduled CCs by the first DCI format to the number of resource blocks valid for the second DCI format according to a given system bandwidth.

Example 54 includes the method of any one of examples 40-53, wherein the second DCI format is one of standard DCI formats used in 3GPP Release 12 LTE system.

Example 55 includes a method comprising: receiving and decode a compact Downlink Control Information (DCI) according to a compact DCI format on a Physical Downlink Control Channel (PDCCH); detecting information associated with a serving cell based on the received compact DCI; wherein the compact DCI format is generated by jointly encoding a plurality of first DCIs having a first DCI format.

Example 56 includes the method of example 55, wherein the first DCI format is one of standard DCI formats used in 3GPP Release 12 LTE system.

Example 57 includes the method of any one of examples 55-56, wherein the compact DCI format includes a plurality of information fields and is generated by jointly encoding common parts of a plurality of information fields in the plurality of first DCIs.

Example 58 includes the method of any one of examples 55-57, wherein the compact DCI format includes one or more Resource Block Assignment (RBA) fields, at least one of the said RBA fields shared by a group of component carriers (CCs) configured by higher layers.

Example 59 includes the method of any one of examples 55-58, wherein each of said one or more RBA fields in the compact DCI format corresponds to a first resource block group (RBG), and a plurality of second RBGs scheduled by a group of CCs are combined into the first RBG; and wherein individual second RBGs of the plurality of second RBGs are scheduled by individual CCs of a group of CCs.

Example 60 includes the method of any one of examples 55-59, wherein the compact DCI format includes one RBA field and the size of this RBA field depends on the number of scheduled CCs by the first DCI format.

Example 61 includes the method of any one of examples 55-60, wherein the granularity of RBA is coarser with a larger number of scheduled CCs than that with a smaller number of CCs.

Example 62 includes the method of any one of examples 55-61, further comprising: receiving a third DCI according to a third DCI format, in scheduling cell UE-Specific Search Space (USS), that the third DCI format includes an information field indicating the presence of scheduling information in the compact DCI format for CCs among multiple CCs scheduled by the compact DCI; wherein the size of the third DCI format is same as the size of one of standard DCI formats used in 3GPP Release 12 LTE system Example 63 includes the method of any one of examples 55-62, wherein one of standard DCI formats used in 3GPP Release 12 LTE system further consisting of DCI format 1A or 1C.

Example 64 includes the method of any one of examples 55-63, the compact DCI format includes information fields of a Hybrid Automatic Repeat Request (HARM) process number, RBA, Modulation and Coding Scheme (MCS), or Transmit Power Control (TPC) command for Physical Uplink Control Channel (PUCCH) and these fields are applied for all CCs scheduled by the compact DCI format.

Example 65 includes a method for wireless communication comprising: receiving a compact Downlink Control Information (DCI) according to a compact DCI format on a Physical Downlink Control Channel (PDCCH); detecting information associated with a serving cell based on the received compact DCI; wherein the compact DCI is generated by concatenating a plurality of information fields of one or more DCIs applied for one Component Carrier (CC) or different CCs.

Example 66 includes the method of example 65, wherein the plurality of information fields are applied for a given CC that is used to schedule uplink and downlink data, or applied for a given set of CCs configured by higher layer.

Example 67 includes the method of any one of examples 65-66, wherein said one or more DCIs are standard DCI formats used in 3GPP Release 12 LTE system.

Example 68 includes the method of any one of example 65-67, wherein the PDCCH includes a Carrier Group Indication Field (CGIF) that is applied to distinguish the Physical Downlink Share Channels (PDSCHs) on different CCs.

Example 69 includes the device comprising means to perform the method of any one of examples 32-68

Example 70 includes one or more non-transitory computer-readable media having instructions, when executed by one or more processors, perform the method of any one of examples 32-68.

What is claimed is:

1. An apparatus comprising:
   generator circuitry to generate downlink control information (DCI), according to a DCI format, that includes a carrier indicator field (CIF);
   transmitter circuitry, coupled with the generator circuitry, to transmit the DCI according to the DCI format to a user equipment (UE),
   wherein the CIF is to schedule a plurality of component carriers (CCs) with a single carrier and the CIF includes Y bits, where Y=ceiling($\log_2 X$)+1, where X is a number of the plurality of CCs scheduled by the single carrier but not including the single carrier.

2. The apparatus of claim 1, wherein the CIF is configured through higher-layer signaling, determined according to a number of configured CCs, or determined according to a number of CCs scheduled by the single carrier.

3. The apparatus of claim 1, wherein the UE is a first UE, the DCI is first DCI, the DCI format is first DCI format, the CIF is first CIF, and the generator circuitry is further to generate second DCI, according to a second DCI format, that includes a second CIF; and
   the transmitter circuitry is to transmit the second DCI according to the second DCI to a second UE.

4. The apparatus of claim 3, wherein a number of bits in the first CIF is larger than a number of bits in the second CIF.

5. The apparatus of claim 3, wherein the second DCI format is one of standard DCI formats used in 3GPP Release 12 LTE system.

6. The apparatus of claim 1, wherein a number of bits in the CIF is larger than 3.

7. An apparatus comprising:
   generator circuitry to generate downlink control information (DCI), according to a DCI format, that includes a carrier indicator field (CIF);
   transmitter circuitry, coupled with the generator circuitry, to transmit the DCI according to the DCI format to a user equipment (UE),
   wherein the CIF is to schedule a plurality of component carriers (CCs) with a single carrier and the CIF includes a plurality of bits that are generated by a combination of bits of a legacy CIF field and a most significant bit (MSB) of a Hybrid Automatic Repeat Request (HARD) process number field.

* * * * *